United States Patent
Patterson

(10) Patent No.: US 7,827,137 B2
(45) Date of Patent: Nov. 2, 2010

(54) SEEDING REPLICATION

(75) Inventor: R. Hugo Patterson, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 286 days.

(21) Appl. No.: 11/807,204

(22) Filed: May 24, 2007

(65) Prior Publication Data

US 2008/0263109 A1  Oct. 23, 2008

Related U.S. Application Data

(60) Provisional application No. 60/925,624, filed on Apr. 19, 2007.

(51) Int. Cl.
*G06F 7/00* (2006.01)
(52) U.S. Cl. .................................. 707/610; 707/640
(58) Field of Classification Search ......... 707/201–204, 707/609, 610, 624, 626, 646, 640
See application file for complete search history.

(56) References Cited

U.S. PATENT DOCUMENTS

| | | | |
|---|---|---|---|
| 2006/0220790 A1 | 10/2006 | Doi et al. | |
| 2007/0061266 A1 | 3/2007 | Moore et al. | |
| 2008/0091894 A1* | 4/2008 | Retnamma et al. | 711/161 |
| 2008/0154928 A1* | 6/2008 | Bashyam et al. | 707/101 |
| 2008/0201393 A1* | 8/2008 | Krauss | 707/206 |
| 2008/0215796 A1* | 9/2008 | Lam et al. | 711/100 |
| 2008/0244204 A1* | 10/2008 | Cremelie et al. | 711/162 |

* cited by examiner

*Primary Examiner*—Wilson Lee
*Assistant Examiner*—Angela M Lie
(74) *Attorney, Agent, or Firm*—Van Pelt, Yi & James LLP

(57) ABSTRACT

Seeding replication is disclosed. One or more but not all files stored on a deduplicated storage system are selected to be replicated. One or more segments referred to by the selected one or more but not all files are determined. A data structure is created that is used to indicate that at least the one or more segments are to be replicated. In the event that an indication based at least in part on the data structure indicates that a candidate segment stored on the deduplicating storage system is to be replicated, the candidate segment is replicated.

26 Claims, 12 Drawing Sheets

US 7,827,137 B2

SEEDING REPLICATION

This application claims priority to U.S. Provisional Patent Application No. 60/925,624 entitled SEEDING REPLICATION filed Apr. 19, 2007 which is incorporated herein by reference for all purposes.

BACKGROUND OF THE INVENTION

A replica system stores the same data or a portion of the same data as an originating system. The replica system can be used to recover data when data in the originating system is corrupted or lost. For efficiency of storage, both the replica and the originating system may be deduplicating systems in which in-coming data is broken up into segments, and if the segment is already stored on the system, a reference to the already-stored segment is stored instead of storing the segment again. Deduplication typically results in a substantial (e.g., 10×) reduction in the amount of space required to store data for the system.

When first starting replication from one system to another, if the replica is to store all of the same data as the originating system, then the task is clear: transfer all the data over. This is efficient for a deduplicating system, since only the deduplicated segments and the references that enable file reconstruction need to be sent. However, if the replica is to store only a portion of the data on the originator system, then it is not obvious which of the segments stored need to be sent over to the replica. One simple solution is to run through the list of references to segments for the portion of the data to be stored on the replica and ask the replica system if the referred to segment has already been stored. The segment is then only transmitted in the event that it is not already on the replica system. However, this requires back and forth traffic for each reference in the list and checking by the replica system for each reference of a segment. With deduplication, there may be many times more of such references than there are actual data segments. It would be beneficial to be able seed replication for a portion of data stored on a deduplicated system without generating traffic and checking for each reference of a segment.

An analogous situation exists when copying a portion of the data stored on one deduplicated system to a second deduplicated system on a one-time basis. All of the segments referenced by the portion of the data being copied need to be sent to the second system. However, as above, checking each reference to see if the corresponding segment is to be sent to a second system, can create substantial traffic between the two systems for each reference that needs to be checked. It would be beneficial to be able to copy a portion of data stored on a deduplicated system without generating traffic and checking for each reference of a segment.

BRIEF DESCRIPTION OF THE DRAWINGS

Various embodiments of the invention are disclosed in the following detailed description and the accompanying drawings.

DETAILED DESCRIPTION

Figure 1:
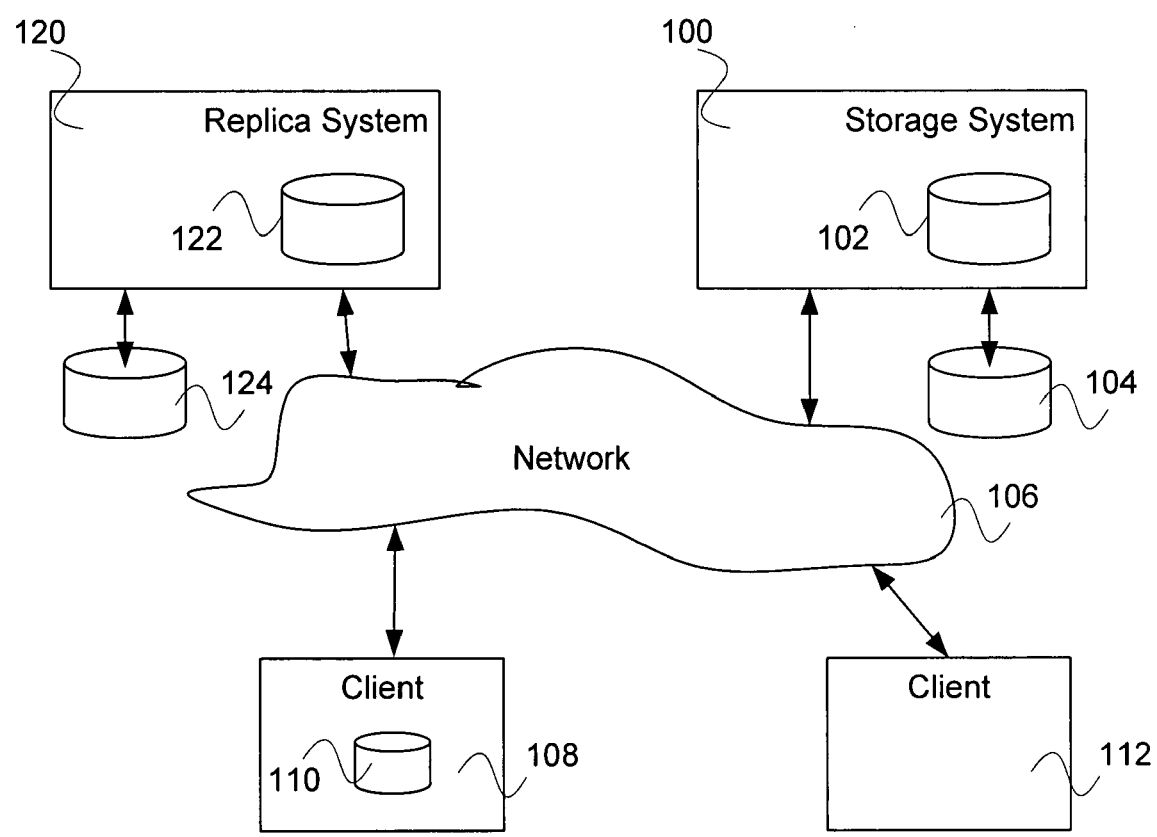
FIG. 1 is a block diagram illustrating an embodiment of a system for seeding replication.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Seeding replication is disclosed. In a deduplicated system, seeding replication for a portion of the data sharing a common pool of segments on an originating system requires determining the segments referenced that enable the reconstruction of the portion of data. A list or a data structure can be generated that contains information regarding referenced segments. For unique segments stored on the originator system, each can be checked using the list or data structure to see if the segment has been referenced by the portion of data. If the segment has been referenced, the segment is sent to the replica system. This allows the communications back and forth between the originating system and the replica system to be reduced to the segment level instead of the reference level. Also, in the case of the data structure, efficient use of memory is possible, since the vector is substantially smaller than the list of unique referenced segments. In addition, the list or the data structure is generated on the originator system without any communication with the replica system saving communication bandwidth between the originator and replica systems.

In some embodiments, multiple files will refer to the same stored segment because the content of a segment in the different files is the same. This is in contrast to a situation where multiple versions of the same file are stored on the same system (e.g., when multiple snapshots of a system are stored on one system) where each of the multiple versions of the same file refer to the same segment. A file may implement a file in a file system, a logical block device, a virtual tape cartridge, a database table, or any other kind of data object or a portion of such a data object that a data storage system may store.

FIG. 1 is a block diagram illustrating an embodiment of a system for seeding replication. In the example shown, storage system 100 stores data for clients represented in FIG. 1 by client 112 and client 108. A client may have a local storage device in addition to local memory. For example, client 108 has storage 110 whereas client 112 does not have a local storage device. Storage system 100 stores data either using internal storage device 102 or attached external storage device 104.

Storage system 100 communicates with clients via network 106. Network 106 comprises one or more of the following: a local area network, a wide area network, a wired network, a wireless network, the Internet, a fiber network, or any other appropriate network enabling communication. Storage system 100 communicates with replica system 120 via network 106 as well. Replica system 120 includes internal storage device 122 and is connected to external storage device 124.

Replica system 120 stores all or a portion of data stored on storage system 100. Initially, all or the portion of data stored on storage system 100 is replicated on replica system 120 by sending appropriate data via network 106. After the initial seeding, replica system 120 is updated by sending from storage system 100 new data. Updating can be continuous, sent in bursts on a regular schedule, when the amount of data exceeds a certain size, or at other appropriate times. In the case of data copying, the initial seeding completes the task and there is no subsequent updating.

In various embodiments, storage devices 102, 104, 122, and 124 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Figure 2A:
FIG. 2A is a block diagram illustrating an embodiment of a portion of a data stream or data block.

FIG. 2A is a block diagram illustrating an embodiment of a portion of a data stream or data block. In the example shown, portion of data stream or data block 200 is shown. Portion of data stream or data block 200 is received by and stored on a storage system such as storage system 100 of FIG. 1. Portion of data stream or data block 200 is sent from one or more clients such as client 108 or 112 of FIG. 1.

Figure 2B:
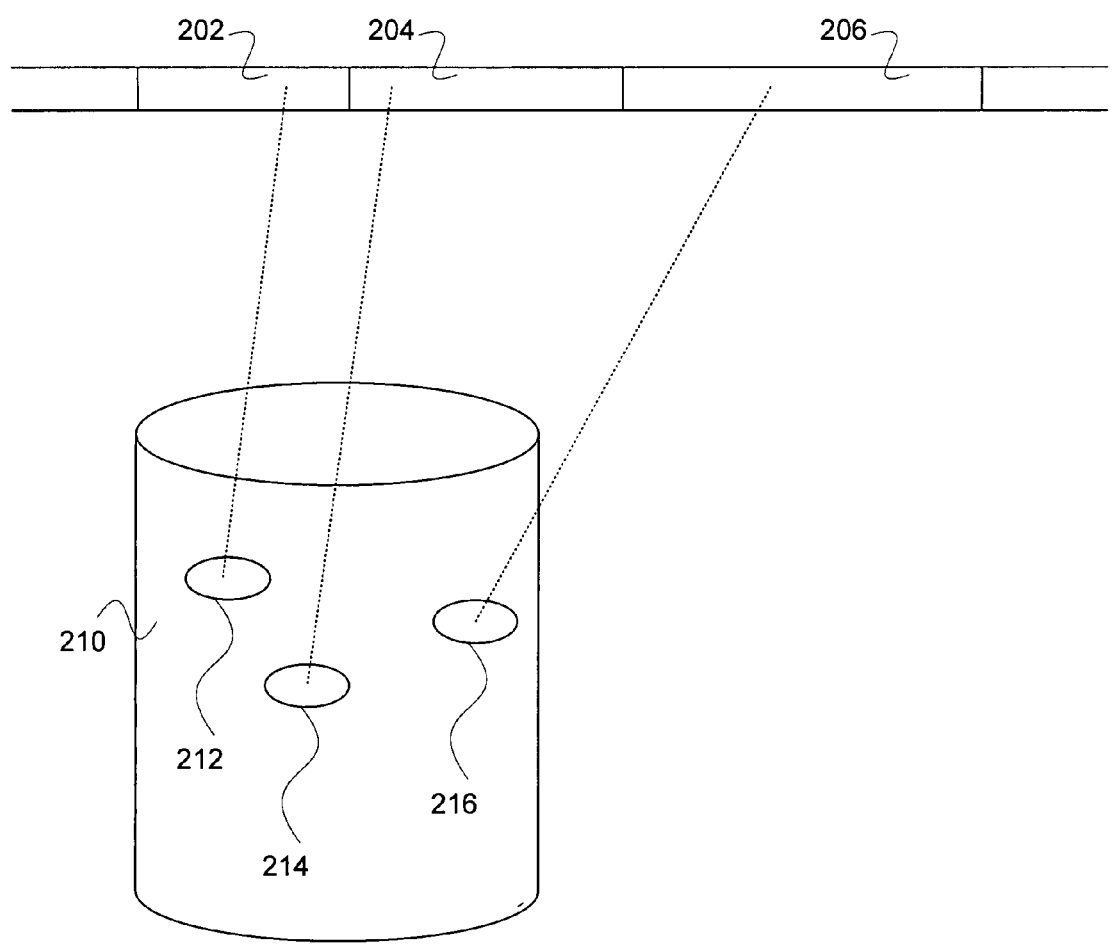
FIG. 2B is a block diagram illustrating an embodiment of segmenting a portion of a data stream or a data block.

FIG. 2B is a block diagram illustrating an embodiment of segmenting a portion of a data stream or a data block. In the example shown, the portion of the data stream or data block is segmented into a plurality of segments represented in FIG. 2B by 202, 204, and 206. The data stream or data block is segmented by creating a plurality of segments from the data stream or data block that can be used to reconstruct the data stream or data block. Segments, when used to reconstruct the data stream or data block, can be overlapping, non-overlapping, or a combination of overlapping and non-overlapping. Segment boundaries can be determined using file boundaries, directory boundaries, byte counts, content-based boundaries (e.g., when a hash of data in a window is equal to a value), or any other appropriate method of determining a boundary. Reconstruction of a data block, data stream, file, or directory includes using references to the one or more segments that originally made up the data block, data stream, file, or directory. Segments such as 202, 204, and 206 are stored in storage device 210—for example, as stored segments 212, 214, and 216 respectively.

Figure 3:
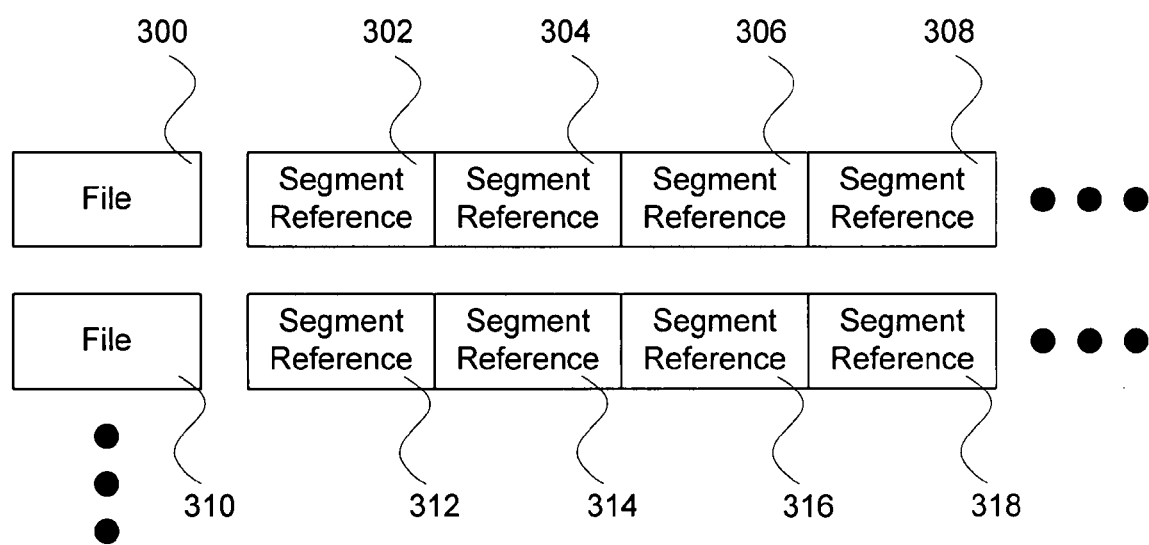
FIG. 3 is a block diagram illustrating an embodiment of file references.

FIG. 3 is a block diagram illustrating an embodiment of file references. In some embodiments, file references can be used to reconstruct a file from segments stored in a storage device such as storage device 210. In the example shown, file 300 can be reconstructed using segment references 302, 304, 306, and 308. File 310 can be reconstructed using segment references 312, 314, 316, and 318. Offsets are stored to enable the reconstruction of files using segment references in the case that there is an overlap or only a portion of the segment reference is used in the reconstruction of the file. A similar referencing structure can be used for a data block, a data stream, a directory, or any other unit of data to enable their reconstruction using segments stored. In various embodiments, a segment reference comprises a content-based reference, a non-content-based reference, a fingerprint, or any other appropriate reference for a segment.

Figure 4A:
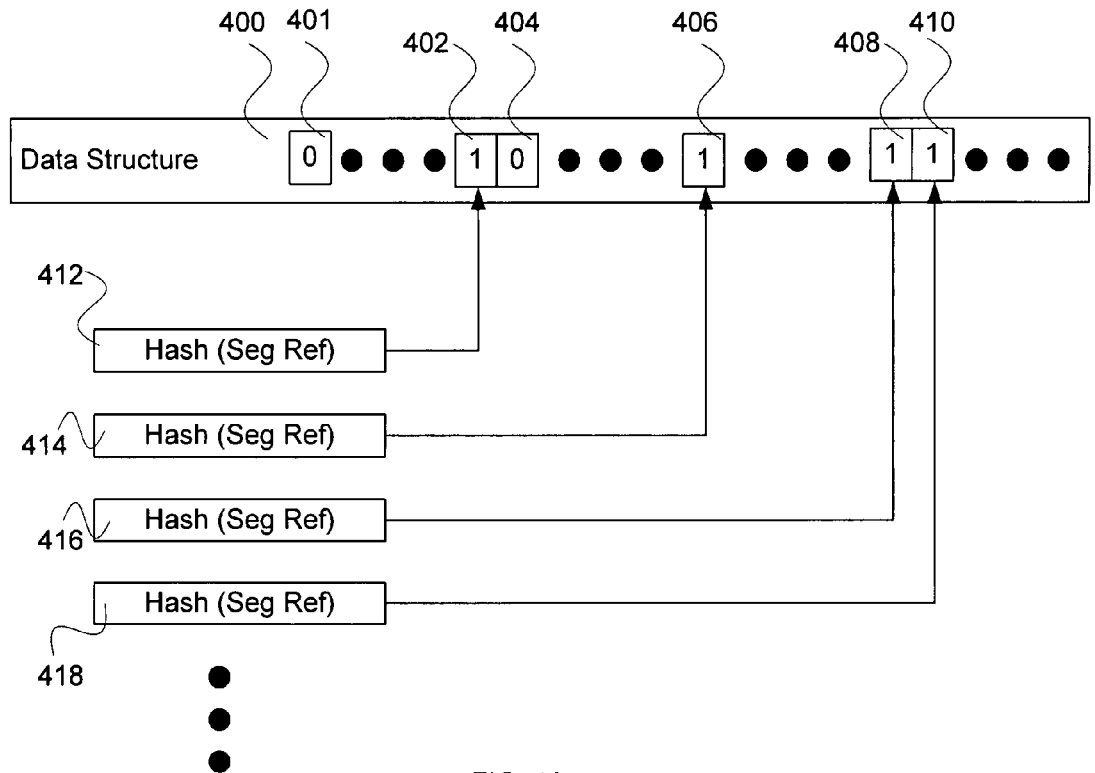
FIG. 4A is a block diagram illustrating an embodiment of a data structure.

FIG. 4A is a block diagram illustrating an embodiment of a data structure. In some embodiments, the data structure of FIG. 4 is used to indicate if a segment was referenced to determine if the segment should be replicated. In the example shown, the data structure 400 includes a plurality of bit locations represented by 401, 402, 404, 406, 408, and 410. The bit locations are initialized to '0'. For a segment that is referenced, a plurality of hashes of the segment reference are calculated—for example, in FIG. 4A hashes of the segment reference are represented by Hash(Seg Ref) 412, 414, 416, and 418. The value of the hash is used to point to a bit location in data structure 400. The bit location pointed to is turned to a '1'. To check if a segment is indicated for replication, the same hashes of a reference to the segment are computed and if all the bits in the locations pointed to by the hashes have been set to a '1', then the segment is presumed to be referenced and should therefore be replicated. In some cases, a segment may appear to be referenced because all bit locations have been set to a '1' even though a reference to the segment was not indicated. Such collisions occur when a combination of other segments indicated happen to set all the locations to a '1'. The length of data structure and the number of hash functions is selected to balance the space required for the data structure, the computation required for the hash functions, and the number of tolerable collisions in the data structure for the segments. It is desirable that data structure 400 be able to indicate reasonably accurately whether a given segment has been referenced so that few segments that do not need to be replicated are replicated. In various embodiments, data structure 400 comprises a Bloom filter or a similar data structure based on hashes.

Figure 4B:
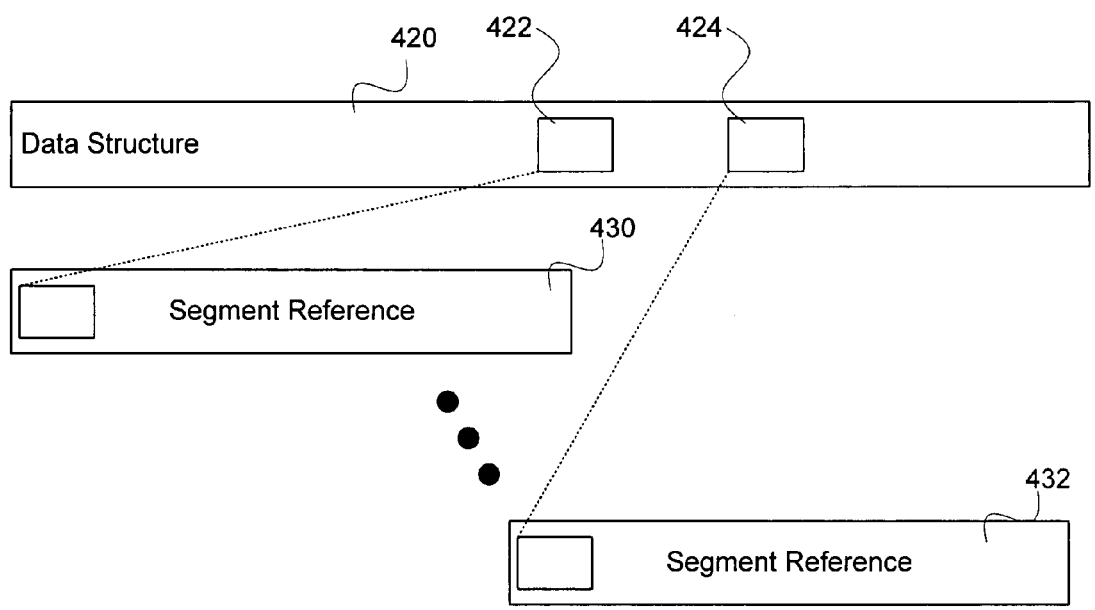
FIG. 4B is a block diagram illustrating an embodiment of a data structure.

FIG. 4B is a block diagram illustrating an embodiment of a data structure. In the example shown, data structure 420 can be used to determine a list of inexact references to segments. A plurality of shortened references is represented in FIG. 4B by 422 and 424. Shortened reference 422 is created from segment reference 430 and placed in data structure 420. Shortened reference 424 is created from segment reference 432 and placed in data structure 420. For example, a shortened fingerprint such as n-bytes (e.g., 4) of a m-byte (e.g., 24)

segment reference can be used as an inexact reference where m is less than n. Segments with references that match in the n-bytes of any of the shortened fingerprints of the data structure are added to a list of segments that are to be sent over from an originator system to a replica system. The use of the n-byte match ensures that necessary segments are replicated. There may be some additional segments transferred. On the other hand, memory space is reduced in using a shortened (e.g., a 4-byte) comparison as opposed to a full (e.g., 24-byte) comparison.

Figure 4C:
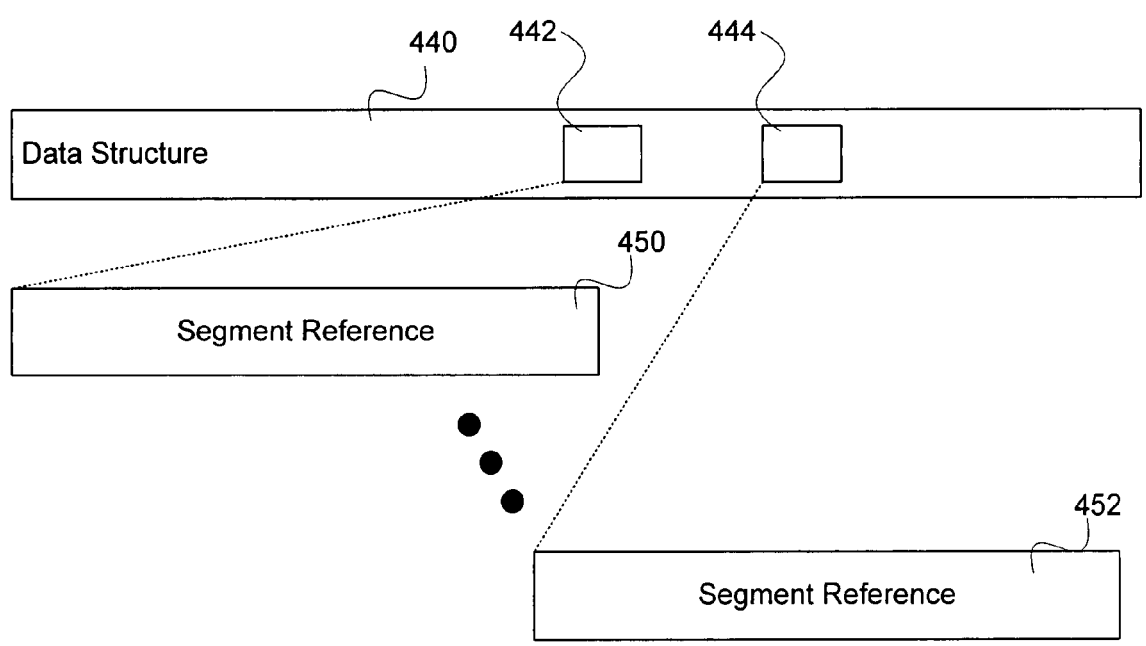
FIG. 4C is a block diagram illustrating an embodiment of a data structure.

FIG. 4C is a block diagram illustrating an embodiment of a data structure. In the example shown, data structure 440 can be used to determine a list of exact references to segments. A plurality of references is represented in FIG. 4C by 442 and 444. Reference 442 is created from segment reference 450 and placed in data structure 440. Reference 444 is created from segment reference 452 and placed in data structure 440. The data structure of exact segments referenced can be used in the process of seeding replication in a replica.

Figure 5:
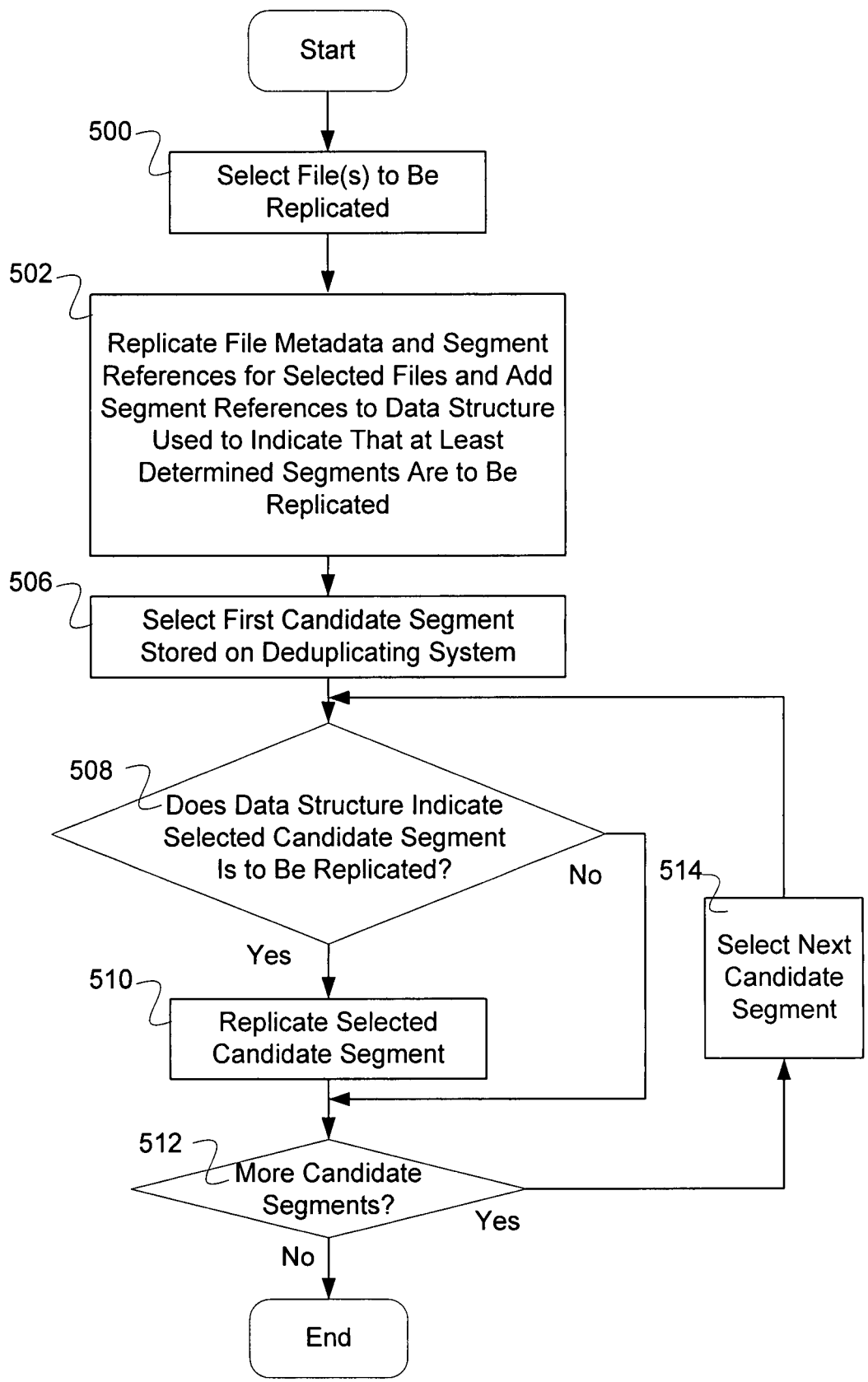
FIG. 5 is a flow diagram illustrating an embodiment of a process for seeding replication.

FIG. 5 is a flow diagram illustrating an embodiment of a process for seeding replication. In some embodiments, the process of FIG. 5 is used to seed a replica system such as replica system 120 of FIG. 1. In some embodiments, the process of FIG. 5 is used to copy a set of data from one system to another. In the example shown, in 500 file(s) is/are selected to be replicated. In various embodiments, file(s) is/are selected using selection of one or more files in a graphic user interface, using a list of files, by clicking in a window, by selecting a directory, by selecting a plurality of directories, using a list of directories, or any other appropriate method of selecting files. In various embodiments, the file(s) may be determined automatically by the system for the purpose of load balancing, meeting quality of service targets or other reasons. In various embodiments, the files to be transferred may implement logical block devices, virtual tape cartridges, or other kinds of sets of data or portions of such sets of data. In 502, file metadata and segment references for selected files are replicated and segment references are added to a data structure used to indicate that at least determined segments are to be replicated. In some embodiments, more segments than those necessary for reconstruction of the selected file(s) are indicated to be replicated. In 506, a first candidate segment stored on a deduplicating system is selected. In 508, it is determined if the data structure indicates that the selected candidate segment is to be replicated. If the selected candidate segment is to be replicated, then in 510 the selected candidate segment is replicated and control passes to 512. If not, control passes to 512. In 512, it is determined if there are more candidate segments. If so, then in 514 the next candidate segment is selected and control passes to 508. In some embodiments, when possible the next candidate segment selected in 514 is one stored (e.g., on the deduplicating storage system) in close proximity to the previous segment for efficient access. If there are no more segments in 512, then the process ends. In some embodiments, every segment stored in the deduplicating storage system is a candidate for replication. In some embodiments, the candidate segments are processed substantially in the order they are located in the deduplicating storage system. This can provide efficiencies by reducing the time spent accessing the segments (e.g., accessing segments in batches or not requiring substantial seeks before a next segment access).

Figure 6:
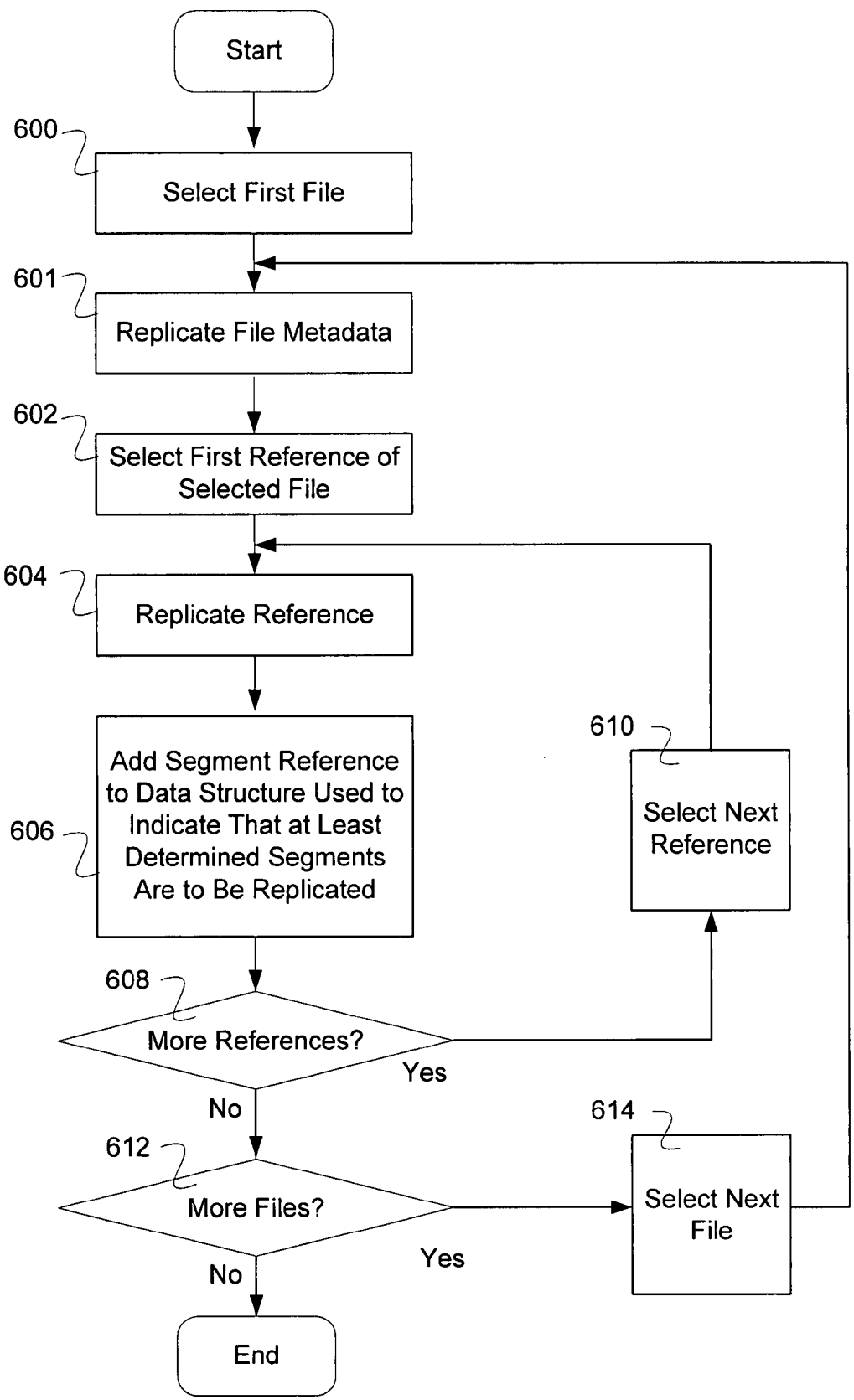
FIG. 6 is a flow diagram illustrating an embodiment of a process for determining referenced segments.

FIG. 6 is a flow diagram illustrating an embodiment of a process for determining referenced segments. In some embodiments, the process of FIG. 6 is used to implement 502 of FIG. 5. In the example shown, in 600 a first file is selected.

In 601, the selected file's metadata (e.g., file name, file size, file create date, etc.) is replicated. In 602, a first reference of the selected file is selected. In 604, the reference is replicated. In 606, segment reference is added to a data structure used to indicate that at least determined segments are to be replicated. In 608, it is determined if there are more references. If so, then in 610 a next reference is selected and control passes to 604. If not, then in 612 it is determined if there are any more files. If so, then in 614 a next file is selected and control passes to 602. If not, the process ends.

Figure 7A:
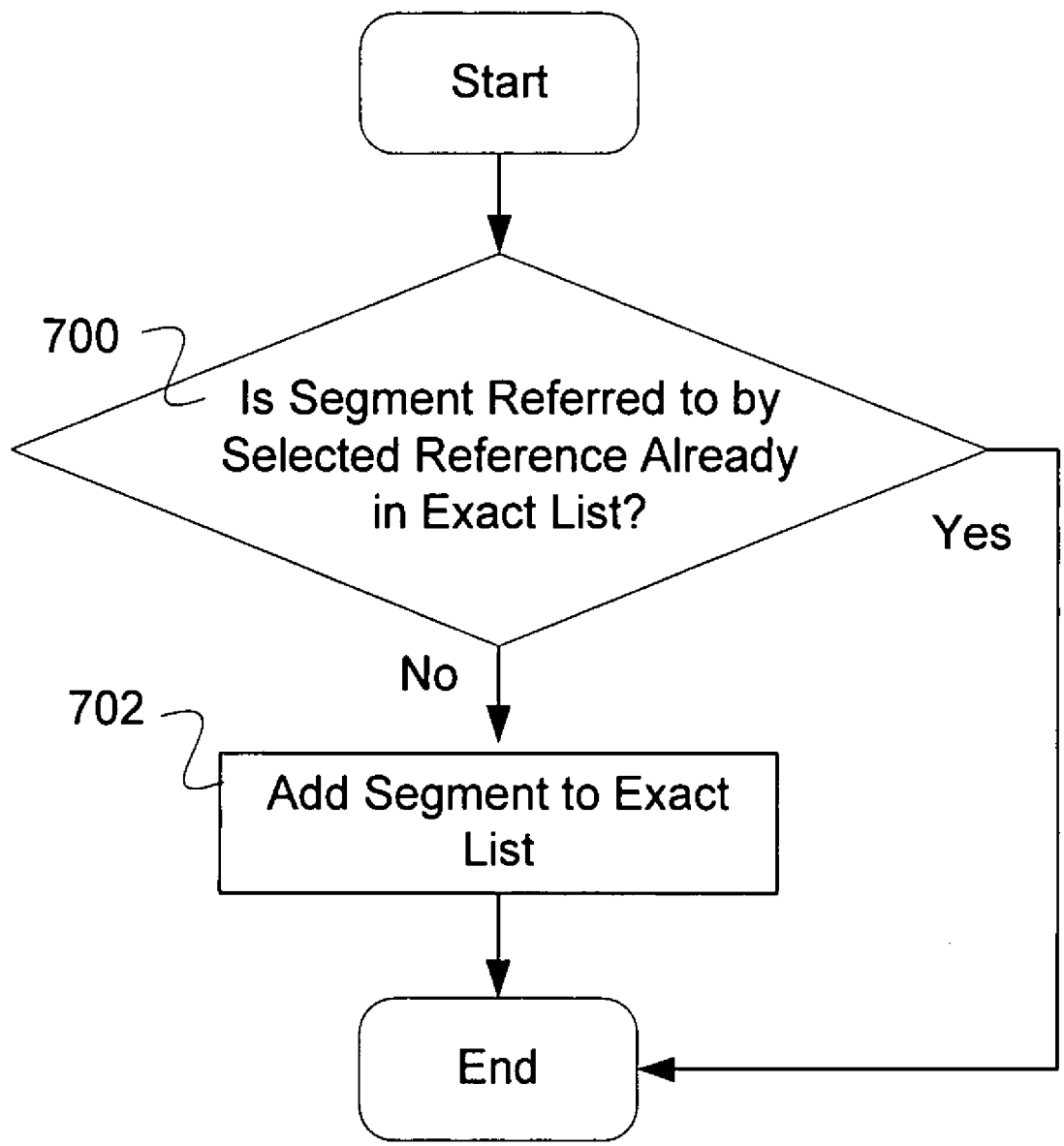
FIG. 7A is a flow diagram illustrating an embodiment of a process for adding to a data structure.

FIG. 7A is a flow diagram illustrating an embodiment of a process for adding to a data structure. In some embodiments, the process of FIG. 7A is used to implement 606 of FIG. 6. In the example shown, in 700 it is determined if the segment referred to by the selected reference is already in an exact list. If so, then the process ends. If not, then in 702 the segment is added to the exact list. The exact list comprises a list of unambiguous references to segments. For example, a list of segment fingerprints or other kinds of references. In various embodiments, the list is generated in such a way as to eliminate or not eliminate duplicate segments appearing on the list, and/or at a time when storing the original files on the originator storage system or at a later time as needed. In some embodiments, the list is sorted by segment reference. In some embodiments, the list is sorted by storage location.

Figure 7B:
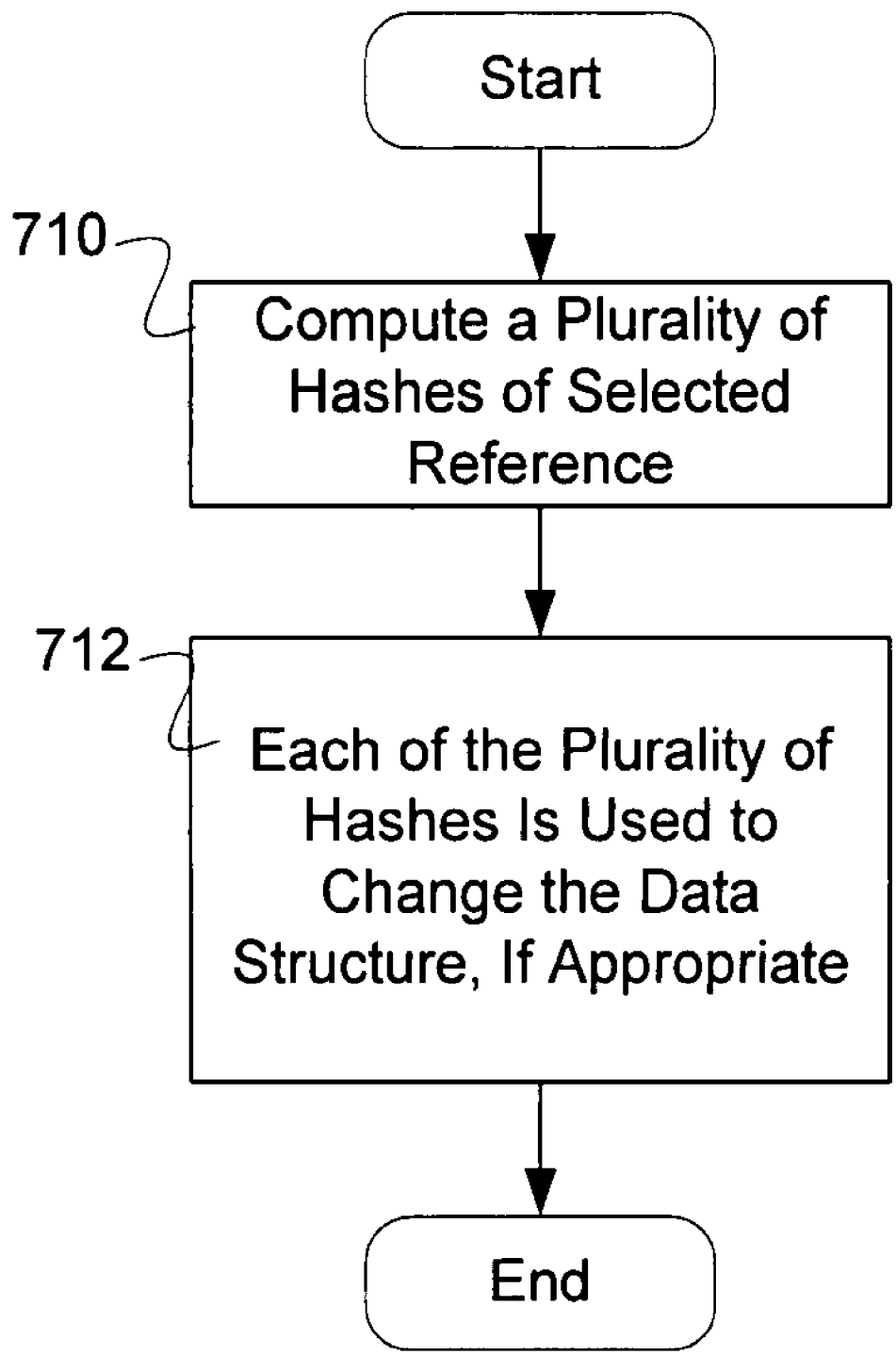
FIG. 7B is a flow diagram illustrating an embodiment of a process for adding to a data structure.

FIG. 7B is a flow diagram illustrating an embodiment of a process for adding to a data structure. In some embodiments, the process of FIG. 7B is used to implement 606 of FIG. 6. In the example shown, in 710 a plurality of hashes is computed of the selected reference. In 712, each of the plurality of hashes is used to change the data structure, if appropriate. If the location has already been changed (e.g., set to '1'), then the location is not changed. In some embodiments, the hash value is used to determine a bit location in the data structure to set to a '1' value. The data structure can be used to determine if a segment was referenced.

Figure 7C:
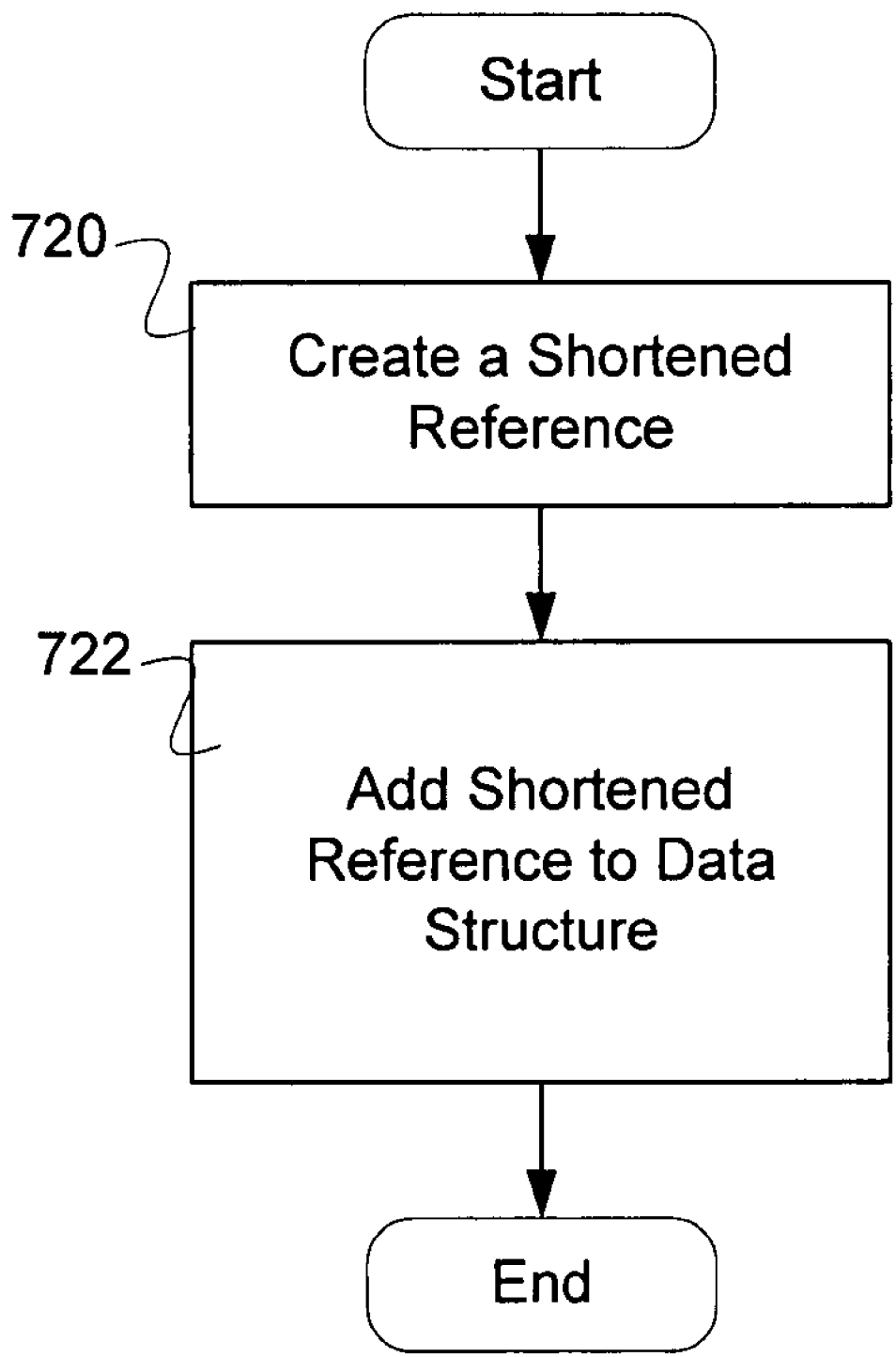
FIG. 7C is a flow diagram illustrating an embodiment of a process for adding to a data structure.

FIG. 7C is a flow diagram illustrating an embodiment of a process for adding to a data structure. In some embodiments, the process of FIG. 7C is used to implement 606 of FIG. 6. In the example shown, in 720 a shortened reference is created. In 722, the shortened reference is added to the data structure. In some embodiments, the data structure is a long list of shortened references. The data structure can be used to determine if a segment was likely referenced. In some embodiments, the data structure comprises a probabilistic data structure. In some embodiments, the probabilistic data structure comprises an inexact list of segments. In some embodiments, the probabilistic data structure comprises a Bloom filter. In some embodiments, the probabilistic data structure indicates a segment is definitely not referenced by a selected one or more but not all files.

In some embodiments, the data structure comprises the list of segments to be replicated as generated by the process of FIG. 6.

Figure 8A:
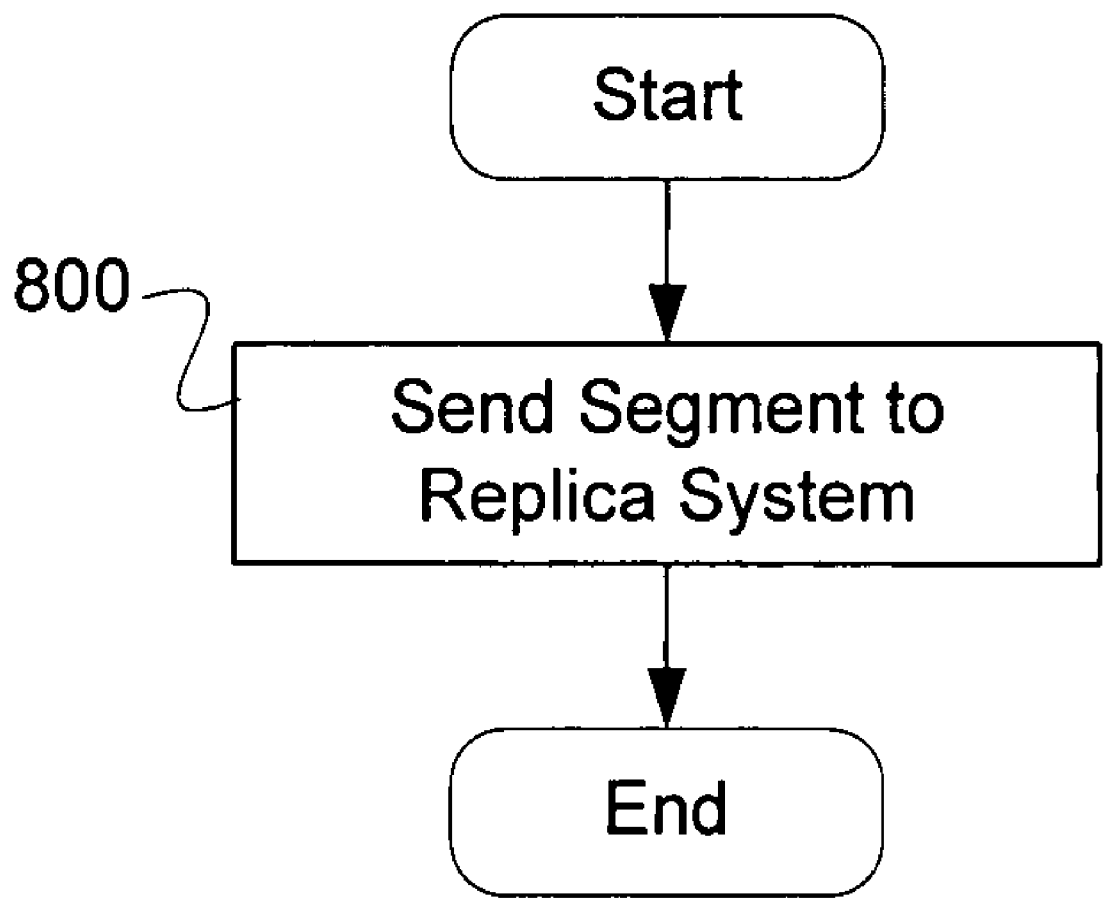
FIG. 8A is a flow diagram illustrating an embodiment of a process for replicating a segment.

FIG. 8A is a flow diagram illustrating an embodiment of a process for replicating a segment. In some embodiments, the process of FIG. 8A is used to implement 510 of FIG. 5. In the example shown, in 800 a segment is sent to the replica system. In this example, the operating assumptions are that the replica system does not already have a copy of the segment and that the segment successfully reaches the replica system. In some embodiments, an acknowledgement is received indicating that the segment has been received and/or stored on the replica system (not shown).

Figure 8B:
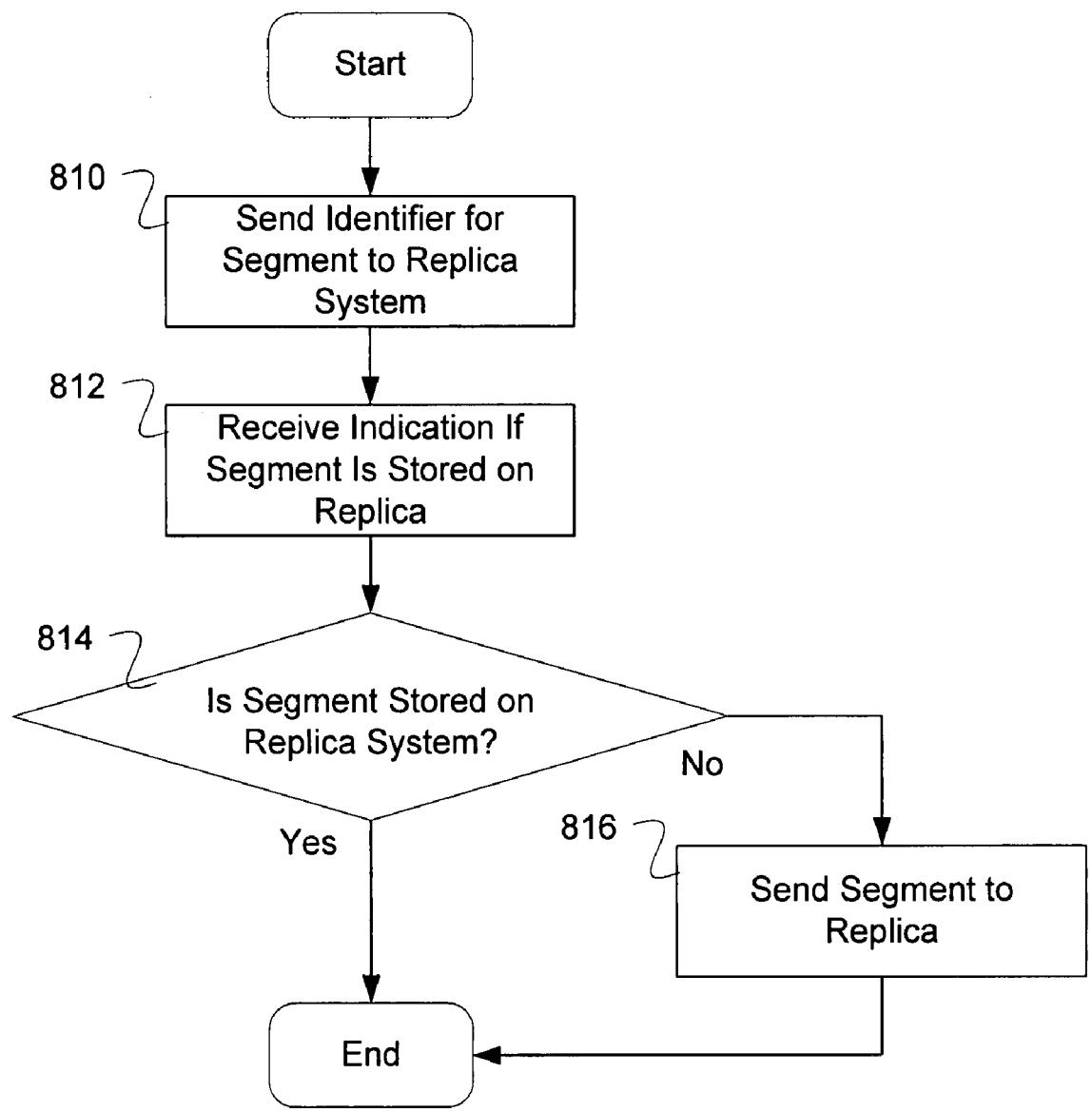
FIG. 8B is a flow diagram illustrating an embodiment of a process for replicating a segment.

FIG. 8B is a flow diagram illustrating an embodiment of a process for replicating a segment. In some embodiments, the process of FIG. 8B is used to implement 510 of FIG. 5. In the example shown, in 810 a segment identifier is sent to the replica system. In 812, an indication is received if the segment is stored on the replica system. In 814, it is determined if the indication indicates that the segment is stored on the replica system. If so, then the process ends. If not, then in 816 the segment is sent to the replica system. In some embodiments, an acknowledgement is received indicating that the segment has been received and/or stored on the replica system (not shown).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of seeding replication comprising:
   selecting one or more but not all files stored on a deduplicated storage system to be replicated;
   determining a plurality of segments referred to by the selected one or more but not all files, wherein a set of one or more segments of the plurality of segments are used to reconstruct a file of the one or more but not all files;
   creating a data structure that is used to indicate that at least the plurality of segments are to be replicated;
   selecting a candidate segment; and
   determining whether an indication indicates that the candidate segment stored on the deduplicating storage system is to be replicated, wherein the indication is based at least in part on the data structure;
   in the event that the indication indicates that the candidate segment stored is to be replicated, replicating the candidate segment; and
   selecting a next candidate segment, wherein the next candidate segment is selected based at least in part on proximity in a storage system to the selected candidate segment.

2. A method as in claim 1, wherein the one or more segments are referred to using a content-based reference.

3. A method as in claim 1, wherein the one or more segments are referred to using a non-content-based reference.

4. A method as in claim 1, wherein the one or more segments are referred to using a fingerprint.

5. A method as in claim 1, wherein the data structure comprises an exact list of segments.

6. A method as in claim 5, wherein the exact list of segments is deduplicated.

7. A method as in claim 5, wherein the exact list of segments is sorted.

8. A method as in claim 1, wherein the data structure comprises a probabilistic data structure.

9. A method as in claim 8, wherein the probabilistic data structure comprises an inexact list of segments.

10. A method as in claim 8, wherein the probabilistic data structure comprises a Bloom filter.

11. A method as in claim 8, wherein the probabilistic data structure indicates a segment is definitely not referenced by the selected one or more but not all files.

12. A method as in claim 8, wherein the probabilistic data structure indicates a segment is probably referenced by the selected one or more but not all files.

13. A method as in claim 1, wherein creating the data structure includes using hash functions.

14. A method as in claim 1, wherein the data structure is constructed as segments are stored on the deduplicating storage system.

15. A method as in claim 1, wherein the data structure is constructed in response to a request to seed a replica system.

16. A method as in claim 1, wherein replicating the candidate segment includes sending the segment to a replica system.

17. A method as in claim 1, wherein replicating the candidate segment includes receiving an acknowledgement that the segment was received or stored on a replica system.

18. A method as in claim 1, wherein replicating the candidate segment includes sending a reference to a replica system to see if a segment referred to by the reference is already stored on the replica system.

19. A method as in claim 1, wherein replicating the candidate segment includes sending the segment in the event that the segment is indicated not to be already stored on a replica system.

20. A method as in claim 1, further comprising replicating one or more references by the one or more but not all files.

21. A method as in claim 20, wherein the one or more but not all files can be reconstructed based at least in part on the one or more references.

22. A method as in claim 1, wherein every segment stored in the deduplicating storage system is a candidate for replication.

23. A method as in claim 1, further comprising processing candidate segments in an order such that at least two successive candidates processed are stored in close proximity in the deduplicating storage system.

24. A method as in claim 1, further comprising processing the candidate segments substantially in the order they are located in the deduplicating storage system.

25. A computer program product for seeding replication, the computer program product being embodied in a computer readable storage medium and comprising computer instructions for:
   selecting one or more but not all files stored on a deduplicated storage system to be replicated;
   determining a plurality of segments referred to by the selected one or more but not all files, wherein a set of one or more segments of the plurality of segments are used to reconstruct a file of the one or more but not all files;
   creating a data structure that is used to indicate that at least the plurality of segments are to be replicated;
   selecting a candidate segment; and
   determining whether an indication indicates that the candidate segment stored on the deduplicating storage system is to be replicated, wherein the indication is based at least in part on the data structure;
   in the event that an indication indicates that the candidate segment stored is to be replicated, replicating the candidate segment; and
   selecting a next candidate segment, wherein the next candidate segment is selected based at least in part on proximity in a storage system to the selected candidate segment.

26. A system for seeding replication comprising:
   a processor; and
   a memory coupled with the processor, wherein the memory is configured to provide the processor with instructions which when executed cause the processor to:
   select one or more but not all files stored on a deduplicated storage system to be replicated;
   determine a plurality of segments referred to by the selected one or more but not all files, wherein a set of one or more segments of the plurality of segments are used to reconstruct a file of the one or more but not all files;

create a data structure that is used to indicate that at least the a plurality of segments are to be replicated;

selecting a candidate segment; and determining whether an indication indicates that the candidate segment stored on the deduplicating storage system is to be replicated, wherein the indication is based at least in part on the data structure;

in the event that an indication indicates that the candidate segment stored is to be replicated, replicate the candidate segment; and selecting a next candidate segment, wherein the next candidate segment is selected based at least in part on proximity in a storage system to the selected candidate segment.

* * * * *